Oct. 23, 1951 M. CAMRAS 2,572,596

MAGAZINE TYPE MAGNETIC RECORDING AND REPRODUCING DEVICE

Filed Dec. 29, 1944 9 Sheets-Sheet 1

Inventor
MARVIN CAMRAS.

by The Firm of Charles W. Hills Attys.

MAGAZINE TYPE MAGNETIC RECORDING AND REPRODUCING DEVICE

Filed Dec. 29, 1944 9 Sheets-Sheet 2

Inventor
MARVIN CAMRAS.

by The Firm of Charles H. Hill Attys.

MAGAZINE TYPE MAGNETIC RECORDING AND REPRODUCING DEVICE

Filed Dec. 29, 1944 9 Sheets-Sheet 3

Inventor
MARVIN CAMRAS.

by The Firm of Charles W. Hills Attys

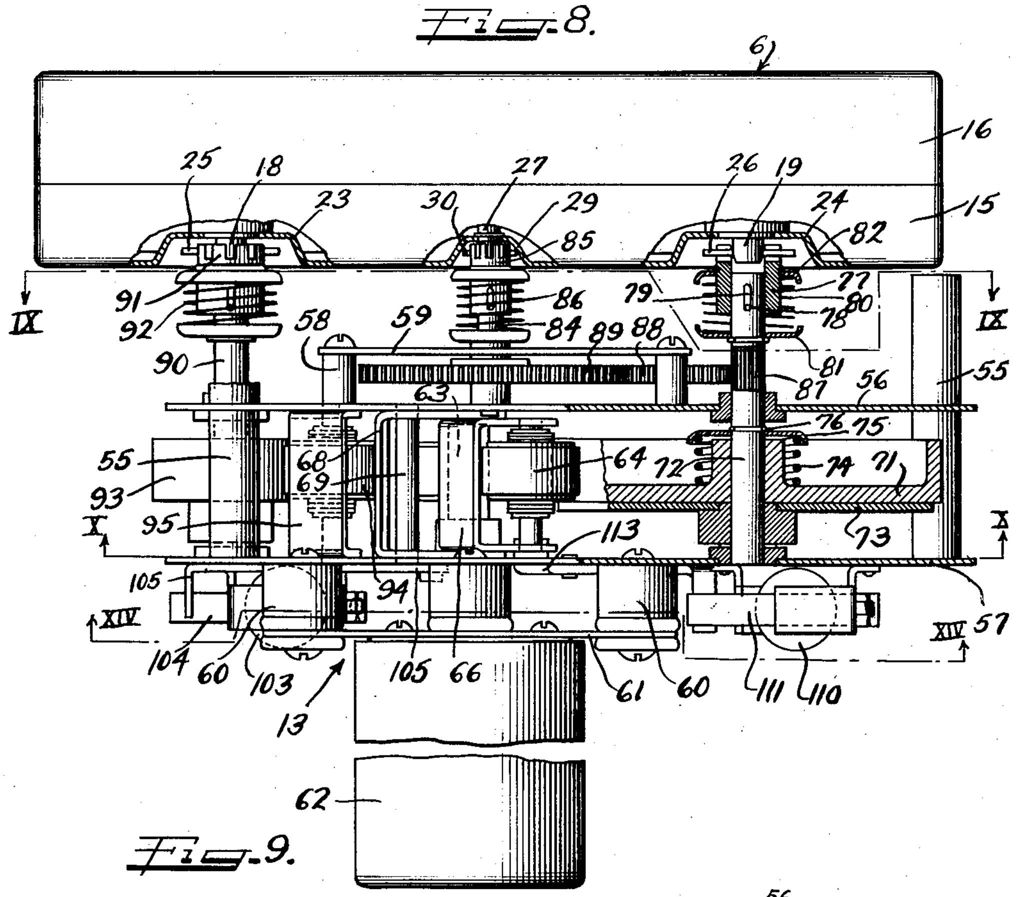
FIG. 8, FIG. 9
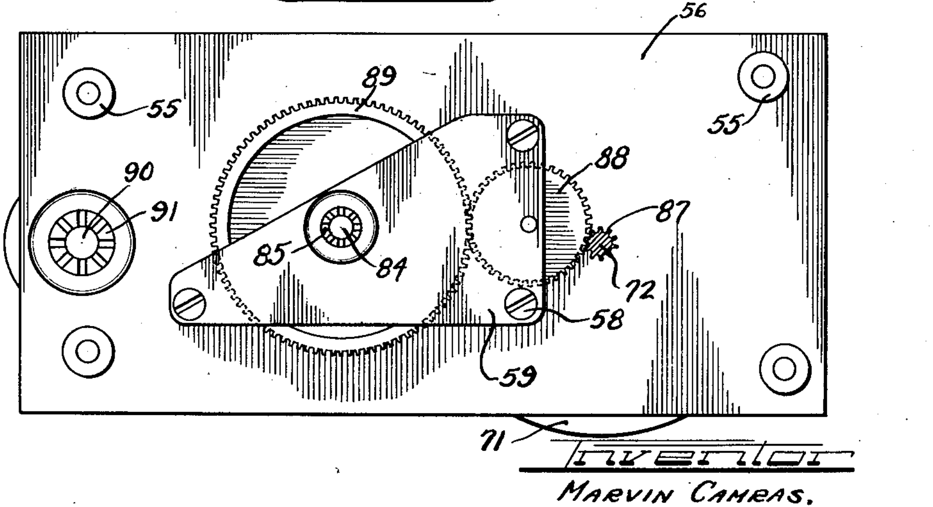
Inventor
MARVIN CAMRAS.
by The Firm of Charles W. Hills Attys.

MAGAZINE TYPE MAGNETIC RECORDING AND REPRODUCING DEVICE
Filed Dec. 29, 1944 9 Sheets-Sheet 5
FIG-10.
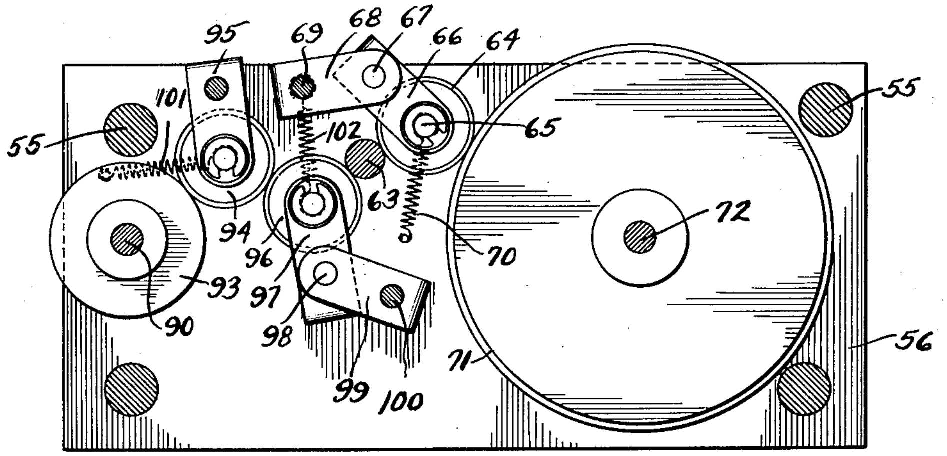
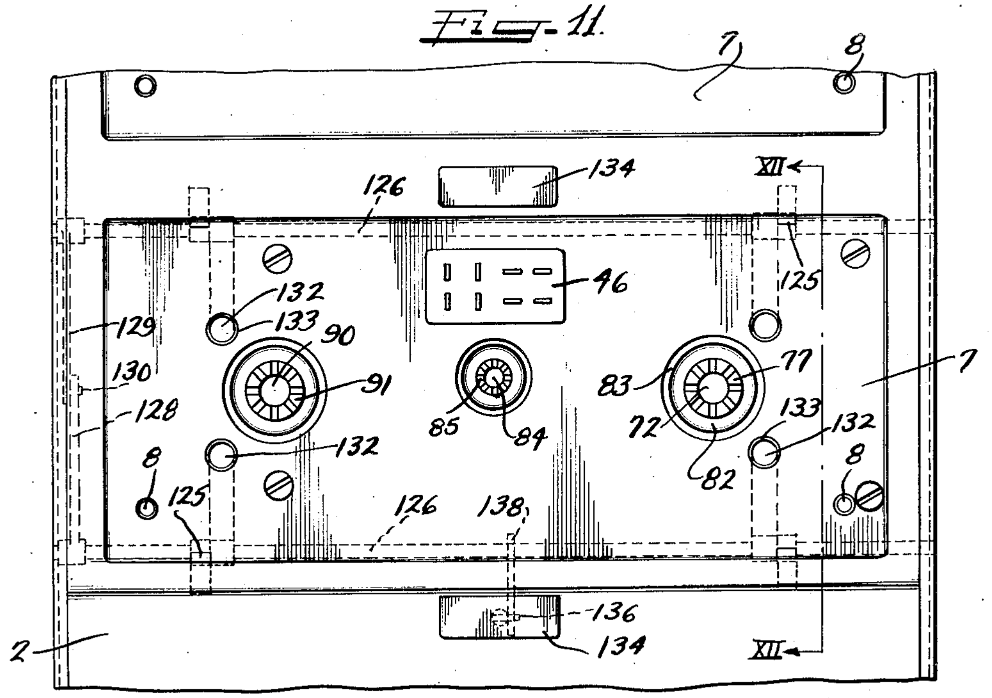
Inventor
MARVIN CAMRAS.
by The Firm of Charles W. Hills Attys.

Oct. 23, 1951 M. CAMRAS 2,572,596

MAGAZINE TYPE MAGNETIC RECORDING AND REPRODUCING DEVICE

Filed Dec. 29, 1944 9 Sheets-Sheet 6

Inventor
Marvin Camras.

by The Firm of Charles W. Hills Attys.

Oct. 23, 1951 M. CAMRAS 2,572,596

MAGAZINE TYPE MAGNETIC RECORDING AND REPRODUCING DEVICE

Filed Dec. 29, 1944 9 Sheets-Sheet 7

Inventor

MARVIN CAMRAS.

by The Firm of Charles H. Hills

Attys.

MAGAZINE TYPE MAGNETIC RECORDING AND REPRODUCING DEVICE

Filed Dec. 29, 1944 9 Sheets-Sheet 8

Inventor
MARVIN CAMRAS.
by The Firm of Charles W. Hills Attys.

Oct. 23, 1951 M. CAMRAS 2,572,596

MAGAZINE TYPE MAGNETIC RECORDING AND REPRODUCING DEVICE

Filed Dec. 29, 1944 9 Sheets-Sheet 9

Inventor
MARVIN CAMRAS.

by The Firm of Charles H. Hills Attys.

Patented Oct. 23, 1951 2,572,596

UNITED STATES PATENT OFFICE 2,572,596

MAGAZINE TYPE MAGNETIC RECORDING AND REPRODUCING DEVICE

Marvin Camras, Chicago, Ill., assignor to Armour Research Foundation of Illinois Institute of Technology, a corporation of Illinois Application December 29, 1944, Serial No. 570,291

18 Claims. (Cl. 179—100.2)

This invention relates to improvements in a magazine type magnetic recording and reproducing device, and more particularly to a magnetic recording and reproducing device usable with record magazines easily attachable to the device proper and removable therefrom when desired for use upon a similar device in a different location, although the invention may have other uses and purposes as will be apparent to one skilled in the art.

In connection with magnetic recording and reproducing devices, wherein a recording of the audible or inaudible impulses may be made by magnetizing an elongated recording medium such as a wire or tape and reproductions may be made from the magnetized medium, it has been found desirable to extend the universality of use of such devices. In the past, such devices, either as a recording device only, a reproducing device only, or a combination recording and reproducing device, have been somewhat limited in their universal aspect, and one of the reasons for such limitation has been the care necessary in handling the recording medium, mounting it upon a machine, removing it therefrom, and the care necessary to transport that medium from one machine to another, even though the transportation be by hand through a relatively short distance. Another reason was in the variance of the length of medium, and the size and character of reels upon which that medium is carried.

It is now desirable to produce a magnetic recording and reproducing instrumentality capable of use with record magazines, each magazine containing reels or equivalent carrying structure, and the recording medium, all housed within an easily transportable, easily usable, and reasonably damage-proof casing. Such casings may be all of substantially the same size or character, and accordingly a single magnetic recording and reproducing instrument may be used to make records for reproduction elsewhere, or be used as a reproducer of records purchased or otherwise acquired elsewhere so that magnetic recordings may be purchased and used for home entertainment in the manner of the commonly known phonograph record. Likewise, such instruments may be utilized in offices in the manner of the commonly known office dictating and reproducing equipment now utilizing wax records. The use of such a machine is then substantially universal.

With the foregoing in mind, it is an important object of the instant invention to provide a magnetic recording and reproducing device capable of functioning with record magazines, or, so to speak, capable of being loaded for either recording or reproducing purposes with a record magazine.

Another object of the instant invention is the provision of a magnetic recording and reproducing device wherein a plurality of record containing magazines may be in operation at the same time, each being actuated for the performance of a different function.

Also an object of the instant invention is the provision of a magnetic recording and reproducing device wherein a recording or reproduction may be made simultaneously with the rewinding of another record medium for recording or reproducing purposes.

It is also a feature of the instant invention to provide a magnetic recording and reproducing device, usable with record magazines, and so constructed to function as a record player, as a record maker, or in the manner of an office dictating machine or office reproducing machine, and wherein one recording may be rewound for later reproduction while another recording carried by a separate magazine may be made or reproduced.

It is also a feature of the instant invention to provide a magnetic recording and reproducing device for use with record magazines, each containing the reels or other carrying means and a magnetizable recording medium, and to which the magazines may be easily connected or slipped into position, and as easily removed therefrom.

A further object of the instant invention is the provision of a magnetic recording and reproducing machine for use with a record magazine containing reels, a magnetizable recording medium, a level wind arrangement, a recording head, an erasing head, and wherein the machine itself contains all of the drive mechanism for operating the movable parts within the magazine.

Another object of the instant invention is the provision of a magnetic recording and reproducing device for use in connection with record magazines, which device is equipped with means to automatically grip the magazine when the magazine is pressed into proper position in association with the device.

It is also an object of the invention to provide a magnetic recording and reproducing device of a character set forth herein embodying means to partially eject a magazine when it is desired to remove the same from the device so as to render that removal operation extremely easy with as little attention as possible required on the part of the operator.

A further feature of the invention resides in the provision of a magnetic recording and reproducing device for use with record magazines, having means associated therewith to function as a safety feature and prevent operation of the device to either record or reproduce if the magazine is not properly positioned in its association with the device itself.

Still another feature of the instant invention resides in the provision of a magnetic recording and reproducing device for use with record magazines, embodying means to stop the prime mover or driving mechanism if the magazine release is actuated, regardless of the setting of the control switches governing the operation of the device.

Still a further object of the instant invention resides in the provision of a magnetic recording and reproducing device for use in connection with record magazines, embodying a repeat arrangement whereby the operator can listen back to a short portion of a record being made at any time desired by the operator.

It is also a feature of the invention to provide such a device for use with record magazines, so constructed that corrections or changes may be made in a record during the making of the record, at the will of the operator.

Another feature of the instant invention is the provision of a magnetic recording and reproducing device of the character set forth herein, having complete push-button operation and control, except for the volume adjustment.

Also a feature of the instant invention is the provision of a magnetic recording and reproducing device usable with recording magazines, with the controlling circuits arranged in substantially fool-proof manner to automatically cut out the effect of one control unit, if another is actuated, to thereby eliminate any possibility of injury to the mechanism, in the event an operator starts an operation, while another operation is in effect.

It is also a feature of the instant invention to provide a magnetic recording and reproducing device embodying a direct friction roller drive system.

Also a feature of the invention is the provision of a magnetic recording and reproducing device embodying a direct, automatic, and quick acting braking system for the movable parts.

Still another feature of the invention resides in the provision of a magnetic recording and reproducing device incorporating relay control of the driving mechanism.

Further, it is an object of the instant invention to provide a magnetic recording and reproducing device usable with record magazines, which device is compact in size, light in weight, economical to operate, and provides a very pleasing appearance.

While some of the more salient features, characteristics and advantages of the instant invention have been above pointed out, others will become apparent from the following disclosures, taken in conjunction with the accompanying drawings, in which Figure 1 is a perspective view of a magnetic recording and reproducing device equipped with magazines, and embodying the principles of the instant invention;

Figure 8 is an enlarged fragmentary elevational view of one of the driving units embodied in the device of Figure 1, with parts broken away and parts in section, and showing one of the magazines in operative association with the unit;

Figure 9 is a plan sectional view of the driving unit of Figure 8, taken substantially as indicated by the staggered section line IX—IX of Figure 8;

Figure 10 is a bottom plan sectional view of the driving unit taken substantially as indicated by the line X—X of Figure 8;

Figure 11 is a fragmentary top plan view of the device of Figures 1 and 7, with the magazines removed;

As shown on the drawings:

Figure 1:
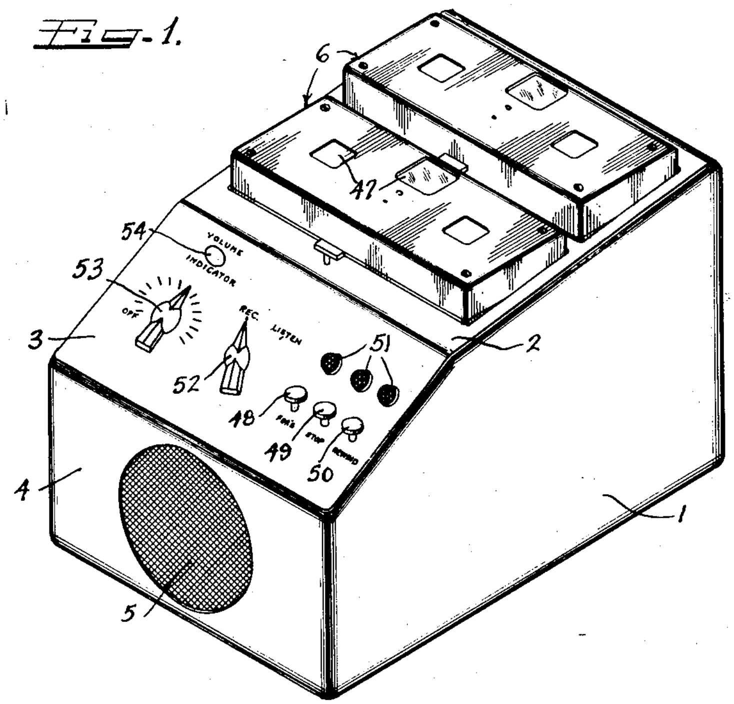
Figure 2:
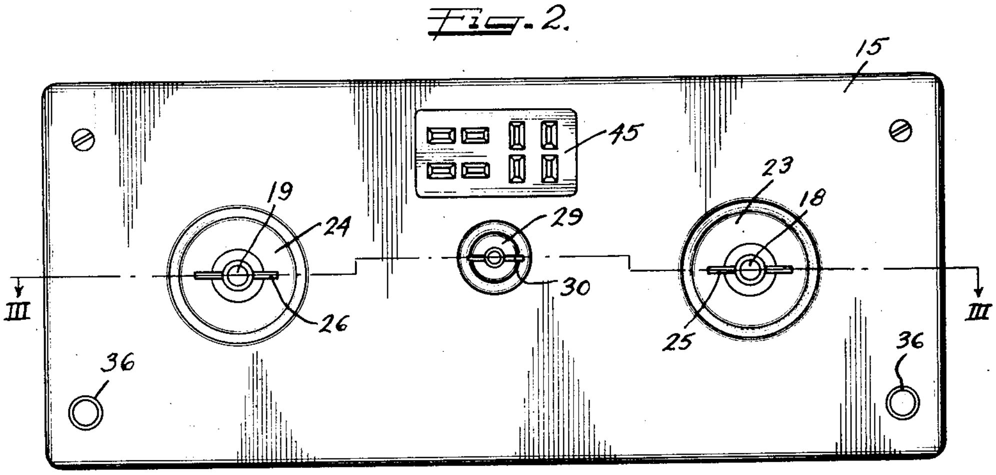
Figure 2 is an enlarged bottom plan view of one of the magazines itself.

In the illustrated embodiment of the instant invention there is shown a combination magnetic recording and reproducing device including a casing 1 having a magazine platform or receiving section 2, a sloping front panel 3 upon which the controls are mounted, a vertical front panel portion 4 having a screened opening 5 therein behind which a loud speaker may be mounted. The magazine platform 2 is shown as carrying a plurality of magazines, in the illustrated instance there being two, which magazines are generally indicated by reference numeral 6. Each magazine is shown seated within a compartment or tray 7 disposed beneath suitable openings in the platform 2, such trays being either fabricated as shown in connection with the platform, or formed integrally therewith as may be desired. Upstanding from the bottom of each tray 7 is a pair of spaced and fixed studs 8 (Figures 6 and 11) which release the automatic braking mechanism contained within the magazines.

Figure 7:
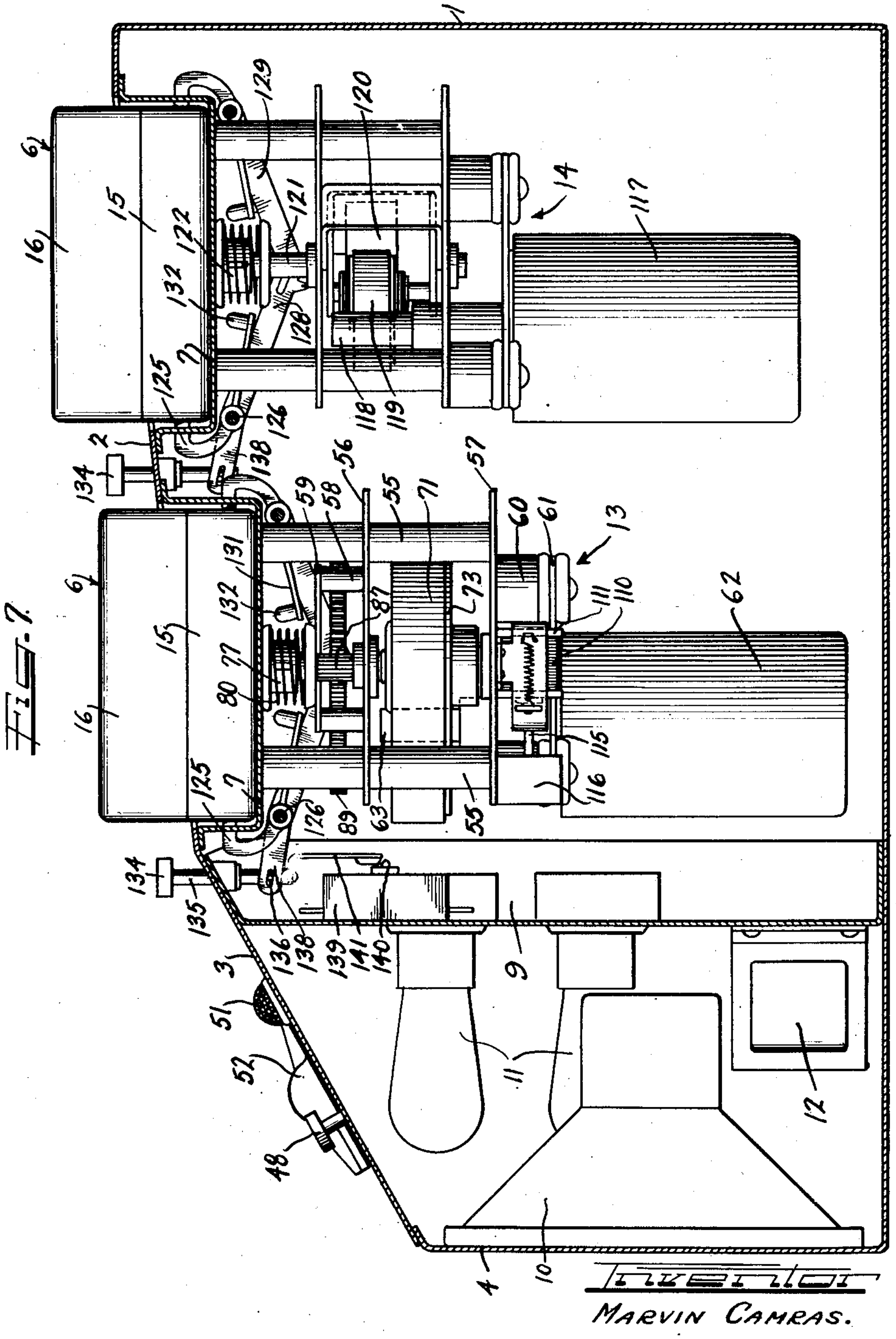
Figure 7 is a longitudinal vertical sectional view, enlarged, of the structure of Figure 1, illustrating the magazines and other parts in elevation for purposes of clarity.

With reference now more particularly to Figure 7, it will be seen that a vertical partition 9 is provided within the casing 1 adjacent the junction between the sloping control panel 3 and the magazine platform 2. This partition defines a forward compartment in which may be disposed a loud speaker unit 10, as well as electronic tubes 11, a transformer 12, and other heavier salient parts of the necessary electrical apparatus. In the rear compartment, behind the partition 9, a driving mechanism including a prime mover for each of the magazines may be disposed, these driving arrangements being indicated generally by numerals 13 and 14 in the showing of Figure 7. The panel or partition 9 may be apertured wherever necessary, and other parts of the electrical circuits, especially the wiring, may be disposed within the compartments on either side of the panel in judicious locations where there is available space.

*The magazine itself*

All the magazines 6 are preferably of identical construction. Such a magazine is more fully disclosed, described, and claimed in my copending application for patent entitled "Magazine for Magnetic Recording and Reproducing Devices," filed July 17, 1944, Serial No. 545,306, now Patent No. 2,484,552, granted October 11, 1949. Certain of the parts disclosed in that copending application have been omitted from the magazines illustrated in the instant application to avoid prolixity, only the salient parts of a magazine being shown herein necessary to properly bring out the operating combination of the present invention.

With reference now more particularly to Figures 2 to 6, inclusive, it will be seen that each magazine includes a two-part casing embodying a base container 15 and a hollow cover 16, there being an inner peripheral band 17 extending above the base 15 to provide a telescopic engagement with the cover 16. Thus, the edges of the base 15 and cover 16 meet in abutment, and the outside surface of the magazine is smooth and substantially uniform, so that the magazines may be stacked, handled, and stored very easily and simply. Inside the magazine casing a pair of shafts 18 and 19 are suitably journalled substantially on opposite sides of the casing, and on these shafts reels or spools 20 and 21 are removably mounted in any suitable manner. These reels carry the recording medium, which in the illustrated instance is in the form of a magnetizable wire 22 (Figure 4), a wire substantially 0.004 inch in diameter being satisfactory. The wire may travel either direction from one spool to the other. In usual operation, the wire will travel from the spool or reel 20 to the reel 21 when either a recording or reproduction is being made. The wire travels in the reverse direction from the reel 21 to the reel 20 during a rewinding operation which places the major portion of the wire again on the reel 20 if the rewinding is complete, or places a portion of the wire again on the reel 20 in the event the rewind operation is relatively short for purposes of listening back to a recording.

Figure 3:
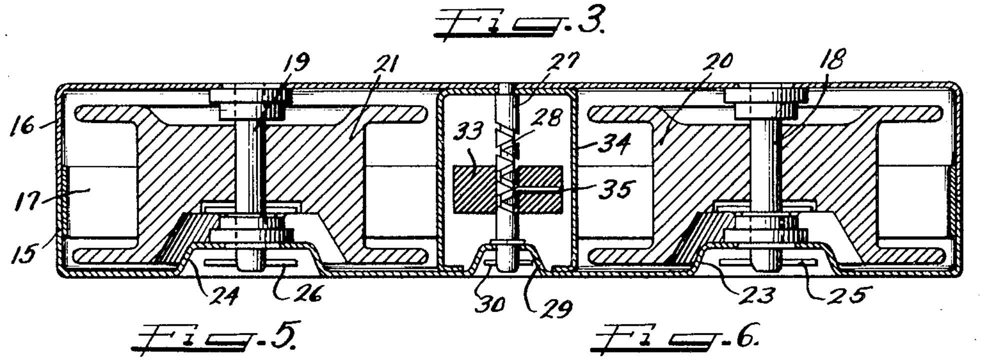
Figure 3 is a longitudinal vertical sectional view, with parts in elevation, taken through a magazine itself, substantially as indicated by the staggered section line III—III of Figure 2, looking in the direction of the arrows.

With reference more particularly to Figure 3, it will be noted that the bottom portion 15 of the casing is indented or recessed around each of the shafts 18 and 19 as indicated at 23 and 24, respectively. The shafts 18 and 19 extend through the recessed portion of the casing, and terminate inside that recess, the lower exposed end of each shaft being provided with a cross pin as indicated at 25 and 26, respectively, for engagement with a drive mechanism to be later described. Substantially in the central portion of the casing is another shaft 27 having an intermediate reversely threaded portion 28 which functions in the same manner as the level wind screw of a fishing reel. This shaft also has an exposed end within a recessed portion 29 in the bottom of the casing, and this exposed end of the shaft is provided with a cross pin 30 also for engagement with suitable drive means. By virtue of the recesses 23, 24, and 29, the undersurface of the casing is kept flat and level at all times, so the magazines may be stacked one upon the other without any injury or maladjustment to the moving parts inside the magazine.

As the wire travels from the reel 20 to the reel 21, it passes through the magnetic field of a head 31 which may be a recording or reproducing head, or a combination head also embodying a cleaning or erasing coil for demagnetizing, uniformly magnetizing, or otherwise cleaning the wire of a previous recording just before the wire enters the influence of the recording magnetic field. When the wire travels in the reverse direction, of course, the head is de-energized, and when a reproduction is being made, the erasing part of the head is de-energized. The head is only diagrammatically illustrated, because various types of heads may be used. Where extreme high fidelity is desired, an aperture of just sufficient size to accommodate the wire may pass through the magnetizable core of the head. In the event extreme high fidelity is to be sacrificed for convenience, the wire or medium 22 may pass through a slot in the recording head having sloping side walls so that in the event of breakage, a knot may be tied in the wire, and the knot successfully passed by the head without any interference. Usually, such a head includes a magnetic core shaped to define confronting pole pieces, and some form of coil means or the equivalent for energizing that core to either magnetize the wire during a recording operation, or to function as pick-up means for the magnetic impulses coming from the magnetized wire during a reproduction operation.

In view of the fact that the same head is used both for recording and reproducing purposes, it will be understood that where the term "recording head" is used herein and in the appended claims, that term is to be taken as also meaning and including a reproducing head.

The head 31 is removably carried by means of suitable spring clamps 32 or the equivalent on a block 33 of insulation material. This block 33 forms a part of the level winding arrangement, and is disposed within an open sided housing 34. As seen best in Figure 3, the block embodies a pin 35 or equivalent structure which rides in the reversely threaded portion 28 of the shaft 27, and causes the block with the head 31 to move up and down the shaft 27 during operation to insure a level winding of the wire or medium 22 upon the then receiving spool.

Figure 5:
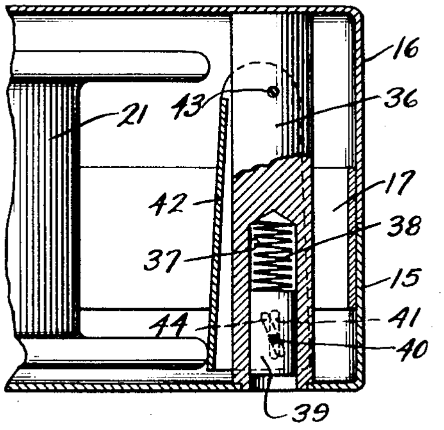
Figure 5 is an enlarged vertical sectional view, with parts in elevation, of a portion of the magazine taken substantially as indicated by the staggered section line V—V of Figure 4.
Figure 6:
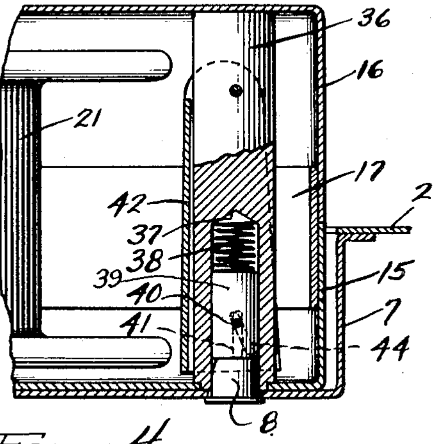
Figure 6 is a view similar to Figure 5 and taken in the same location, but showing the parts of the magazine in association with the magazine tray of the device, and the movable parts in a different position.
Figure 4:
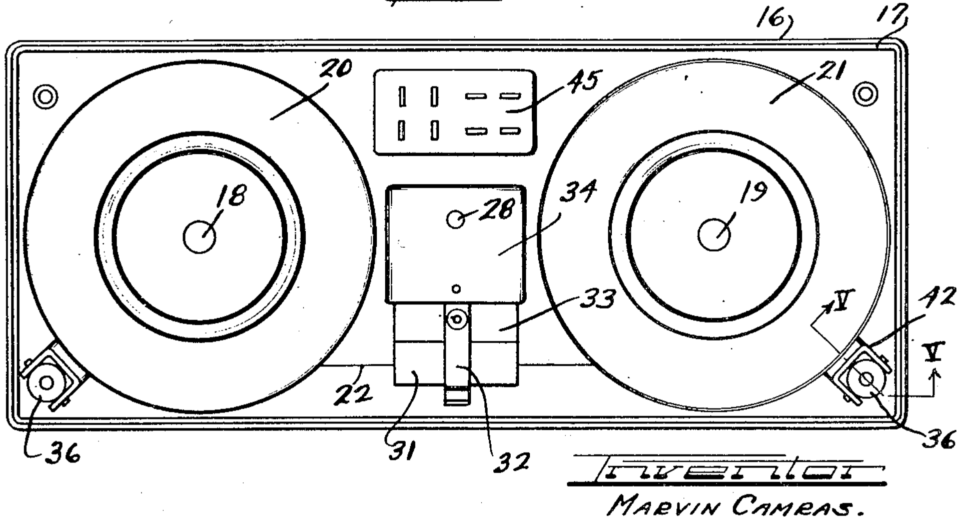
Figure 4 is a top plan view of the magazine itself, with the cover removed, looking into the interior of the magazine.

The magazine also includes automatically functioning brake mechanism for the reels. In view of the fact that an identical brake mechanism is associated with each reel, only one need be described herein. With reference more particularly to Figures 5 and 6, it will be seen that adjacent each reel an upright post is provided in the casing of the magazine. Such post 36 extends through the bottom of the magazine and is provided with a hollow cavity 37 therein. Within that cavity is a coil spring 38 operating against a plunger 39. Normally the spring tends to force the plunger 39 out of the cavity, but such movement of the plunger is limited by a cross pin 40 carried by the plunger and having its opposite ends riding in a vertical slot 41 in the post. A braking member 42 which is of substantially a U-shape, as seen in Figure 4, is pivoted at its upper end to the post by a pivot pin 43. This braking element has a diagonal slot 44 therein also engaged by the plunger pin 40. When the parts are in normal position, that is with the magazine removed from its aforesaid tray 7, the brake member 42 will bear against one of the flanges of the adjacent reel, as seen in Figure 5, by virtue of the action of the spring 38. However, when the magazine is placed into position in the tray 7, the aforesaid stud 8 extending upwardly from the bottom of that tray forces up the plunger against the action of the spring 38 and by virtue of the pin 40 riding in the oblique groove 44 of the brake member, the brake member is retracted to the position seen in Figure 6, thus permitting free rotation of the respective reel.

Immediately upon lifting the magazine out of the tray 7 the spring 38 forces the plunger downwardly and sets the brake against the reel. The advantage of this arrangement is that the reels are held against rotation when the magazine is not in use so that the recording on the wire may be kept in exactly the same place, if so desired, and there is no danger of scrambling the wire by unintentional or accidental rotation of the reels within the magazine.

A suitable plug-in socket 45 is mounted in the bottom of the magazine for automatic engagement with a complemental plug 46 in the bottom of the magazine tray 7, as seen in Figure 11. Thus, when the magazine is pressed into position in the tray all circuit connections for the head 31, and for passing current through the wire itself by means not illustrated, are at once established. Accordingly, insofar as the magazine is concerned, nothing need be done by the operator except to place the magazine in position in the receiving tray 7 and all necessary circuit connections, brake release, and driving connections are automatically made.

With reference to Figure 1 it will be seen that each of the magazines may be provided with a plurality of windows 47 through which the operator might observe the rotation of the respective reels, and through one of the windows a scale denoting time increments of a recording, increments of length of the wire collecting upon one of the reels, or some equivalent means of measuring the amount of wire utilized in a particular recording, may be visible. Such a scale and the means for actuating the indicating finger thereof have not been illustrated in the drawings but may be incorporated in the magazine in any suitable manner.

*The control panel*

The control panel 3, seen in Figure 1, has mounted thereon all of the control and indicating means necessary for the actuation of the entire device. The control means include a forward push-button 48, a stop push-button 49, and a rewind push-button 50, each push-button being accompanied by a jewel lamp 51 to indicate which is in operation. There is also a dial 52 movable between recording and listen position, that particular dial 52 being set upon the listen position when a reproduction is being made. Further, there is a volume control 53 with a suitable volume indicator 54 thereadjacent, by means of which the operator can adjust the volume both for recording and for reproduction.

As much as possible, the controls are in the nature of push-buttons in the preferable construction. It will be apparent that two push-buttons might be substituted for the switch 52, if so desired, in a well-known manner. Also, as will more fully appear later herein, the respective push-buttons are so arranged and so connected in the wiring circuit, that if one of the buttons is pressed while operation is proceeding as a result of the actuation of another button, the proceeding operation will be immediately stopped and the new operation begun, automatically and without injury to either the mechanical parts or the electrical circuit.

*The drive units*

The drive units are best seen in Figures 7 to 14, inclusive. These units are preferably suspended from the bottoms of the magazine receiving trays 7—7. The drive unit 13 associated with the magazine used for recording and reproducing purposes is somewhat more complicated than the drive unit 14 associated with the rewind magazine, in that the unit 13 must include both a forward drive and a reverse drive preferably of different speeds, together with an automatic braking system, while the rewind unit 14 need only have what corresponds to the reverse drive in the first unit. Both units are similarly located, similarly mounted, and similarly operated. Accordingly, it is only necessary herein to specifically describe the unit 13.

As seen best in Figures 7 and 8, the driving unit 13 is suspended from the bottom of the tray 7 by means of a plurality of posts 55, there being four in the illustrated instance. These supporting posts 55 carry a pair of spaced horizontally disposed platform frames 56 and 57, and it will be understood that the frame members 56 and 57 carry suitable bearing means to accommodate the journals of the various shafts. Elevated from the frame platform or plate 56 by a series of posts 58 is another frame plate 59 of lesser size to provide additional bearing means where needed. Suspended from the lower frame plate 57 by means of a plurality of insulating supporting posts 60, three in the illustrated instance, is a motor supporting plate 61.

Suspended from the plate 61 is a prime mover which in the illustrated instance is in the form of an electric motor 62. The armature shaft of this motor extends upwardly through a suitable aperture in the frame plate 57 so that this shaft 63 is in position for engagement by a friction drive roller 64. This drive roller 64 is an idler, and its shaft 65 is freely journalled in a U-shaped bracket 66 pivoted as at 67 between the confronting jaws of another U-shaped bracket 68 fixed in position between the frame plates 56 and 57 by a keyed post 69, as best seen in Figure 10. A spring 70 constantly urges the drive wheel 64 into frictional engagement with the motor shaft 63 and with a circumferential surface of a hollow friction clutch 71 floating on a shaft 72. With reference to Figure 8 it will be seen that the face of the clutch 71 is pressed into frictional engagement with a drive wheel 73 by means of a spring 74 surrounding the hub of the clutch and bearing against a collar 75 held in proper position relatively to the shaft 72 by a spring ring 76. The drive plate 73 is, of course, keyed to the shaft 72. It will be appreciated that the clutch 71 is in the nature of a slip clutch so that if for any reason the motor should be operating at too high a speed at any interval of time, no injury will result to the wire recording medium 22, because slippage will occur between the clutch 71 and the drive plate 73. The same protection to the medium results upon application of the brake means.

Telescoped over the upper end of the shaft 72 is a castellated head 77 secured to the shaft by means of a transverse pin 78 extending through an elongated slot 79 in the shaft. A spring 80 disposed between a pair of collars 81, disposed around the shaft, and 82 fixed to the head 77 constantly urges this head outwardly or upwardly so that the head constantly extends through a suitable aperture 83 (Fig. 11) in the bottom of the magazine receiving tray 7. The castellated head 77 is thereupon in position to be automatically engaged by the aforesaid pin 26 on the shaft 19 of the reel 21 when the magazine is placed in position, such engagement being seen in the upper right-hand portion of Figure 8. By virtue of the castellations in the head 77, the driving engagement of the pin 26 with that head will be automatic, and if it should so happen that the pin did not enter opposed grooves in the head at the time the magazine is placed in position, it will so enter the grooves immediately upon the starting of the motor.

For effecting a drive of the aforesaid level wind shaft 27, a shaft 84 is suitably journalled in the frame plates 56 and 59. This shaft extends upwardly and is provided with a castellated head 85 urged upwardly by a spring 86 in the same manner as above described in connection with the castellated head 77 on the shaft 72. The castellated head 85 is engaged by the pin 30 of the shaft 27 when the magazine is seated into position in the tray 7.

The shaft 84 and consequently the level wind shaft 27 are driven by the shaft 72 through a gear train comprising an integral gear portion 87 formed on the shaft 72, a gear 88, having a shaft suitably journalled in the plates 56 and 59, and a gear 89 keyed to the shaft 84. It will be noted that this gear train is a reduction gearing arrangement so that the level wind shaft 27 is driven at a considerably lower speed than the shaft 72 and the shaft 19 of reel 21.

The driving arrangement so far described effects a positive drive of the reel 21 and also of the level winding arrangement. This, as explained above, is a drive in the forward direction, in which event the reel 21 is the receiving reel for the recording medium 22 and during such operation either a recording or a reproduction is in process. When it is desired to reverse the direction of the recording medium for rewinding purposes, the reel 21 becomes the supply reel and is permitted to idle, while a positive drive of the reel 20 is established. When the reel 20 is positively driven the level wind arrangement is driven solely by the pull on the wire recording medium 22. At that time, while the reel shaft 19 and the drive shaft 72 will both be coasting they nevertheless will be turned by the pull of the wire because they are still connected, thus the level wind will also be driven by virtue of the gearing 87, 88 and 89, as above explained. The recording medium has more than ample tensile strength to accomplish this drive of the level wind arrangement.

The direct drive arrangement for the reel 20 includes a shaft 90, having a castellated head 91 telescoped over the end of the shaft and urged outwardly by a spring 92 in the manner above described for the other shaft. This shaft also carries a friction wheel 93 engaged at all times by an idler friction wheel 94 journalled in a fixed frame member 95, as seen clearly in Figures 8 and 14. This idler wheel 94 may be frictionally engaged by a friction drive wheel 96 journalled in a frame 97 pivoted on a pin 99 anchored in the confronting arm of another U-shape frame member pivoted between the plates 56 and 57 on a pin 100, as clearly seen in Figures 10 and 14. A spring 101 urges the idler wheel 94 into contact with the friction wheel 93, and a spring 102 urges the friction drive wheel 96 into contact with both the idler wheel 94 and the motor shaft 63.

From the description thus far, and with reference to Figure 10, it will be noted that when the power is off the friction drive wheel 64 is in operative position tending to move the recording medium 22 in the forward direction, at the same time the friction drive wheel 96 is in operative position tending to move the recording medium in the reverse direction. Consequently, the medium is held at a standstill by this novel automatic braking method. If the drive wheel 96 is retracted against the action of spring 102 by means to be later described, and the apparatus is operating in the forward direction, immediately upon stopping the forward movement, the drive wheel 96 is released and pulled into operative position by the spring 102 so that an immediate and effective braking action results. Conversely, if the wheel 96 is in operation moving the recording medium in the rewind direction, and the wheel 64 is retracted, this wheel 64 is pulled into operative position by the spring 70 immediately upon stopping of the rewind movement. Therefore, there will clearly be no overrunning or coasting of either of the reels upon stopping an operation, because the friction drive element will promptly brake the moving parts positively and yet sufficiently gently to eliminate any likelihood of injury to the recording medium.

Figure 14:
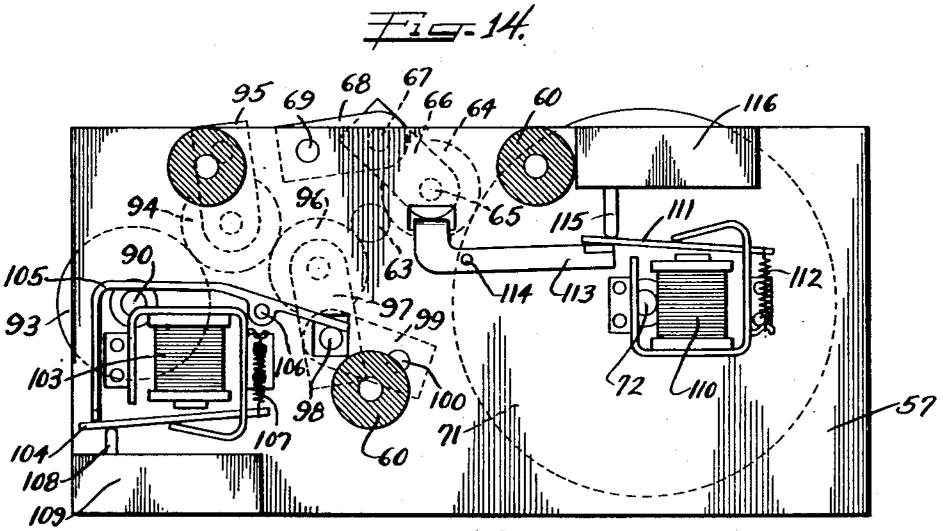
Figure 14 is another bottom plan sectional view of the driving unit taken substantially as indicated by the line XIV—XIV of Figure 8.

Control of the friction drive wheels is accomplished by means of relays, in the illustrated instance. These relays and their operation are best illustrated in Figures 8 and 14. When the forward button 48 (Fig. 1) is pressed the motor 62 is energized and the recording medium is moved in the forward direction by means of the friction drive wheel 64 and the slip clutch 71 causing a positive drive of the shaft 19 of the reel 21. Not only is that accomplished, but the pressing of that forward button 48 also energizes a relay 103 (Fig. 14) causing a movement of the armature 104 of that relay towards the core. The armature thereupon moves a pivoted lever 105 about its pivot point 106 against the action of an armature retracting spring 107. The free end of the lever 105 abuts the aforesaid pivot pin 98 and moves it in such a manner as to withdraw the friction drive wheel 96 from its contact with the motor shaft 63 and with the idler friction wheel 94. When the relay 103 is actuated, and the armature moves, the armature releases the plunger 108 of a gang switch 109 controlling other sub-circuits of the apparatus, which gang switch will be more fully explained in connection with the wiring diagram of Figure 21.

When the stop button 49 is pressed, the motor 62 is not only deenergized, but the relay 103 is also deenergized, and the automatic braking means above described come into effect by virtue of the release of the friction drive wheel 96. Likewise, the plunger of the gang switch 109 is permitted to move in the opposite direction and reverse the energization of the sub-circuits controlled by that switch.

When the rewind button 50 is pressed the motor 62 is again energized, and the recording medium 22 is moved in the reverse direction by the drive from the motor shaft through the friction wheel 96, the idler friction wheel 94, and the friction drive wheel 93 on the shaft 90, creating a positive drive of the shaft 18 of the reel 20. The reel 21 is now the idler and supply reel. At the same time, a relay 110 is energized to draw in its pivoted armature 111 against the action of a retracting spring 112. The free end of this armature bears against a pivoted lever 113 and moves that lever about its pivot point 114 so that the opposite end of the lever which is normally in abutment with the frame bracket 66 carrying the friction drive wheel 64 will move that frame bracket so that the drive wheel is carried away from its contact with the motor shaft 63 and the slip clutch 71. The movement of the armature 111 also releases the plunger 115 of a gang switch 116, causing that gang switch to exercise a control over certain sub-circuits to be later described.

When the stop button 49 is again pressed, the motor 62 and relay 110 are both deenergized, permitting the friction drive wheel 64 to again fall into contact position with the motor shaft 63 and the slip clutch 71, bringing into effect the above described braking system. At the same time, the plunger 115 of the gang switch is released so that the energization of those sub-circuits is also reversed.

As will more fully later appear, the circuits are substantially fool-proof so that in the event the forward button has been pressed for forward operation. and in lieu of the stop button being pressed. the rewind button is pressed, there will be no damage done. There will be a temporary stopping, the braking arrangement will come into effect temporarily, and operation will resume in the opposite direction without injury to any of the parts and without any sudden jerk or undue tension upon the recording medium 22.

With reference to Figure 7, it will be seen that a similar drive unit is employed for actuating the reels of the rearward magazine to cause a rewinding of the recording medium in that magazine. This second drive unit 14, while similar to the unit 13, need not employ all of the mechanism of the unit 13, such as the relays and the forward drive arrangement. The drive unit 14 includes a motor 117 having an upstanding armature shaft 118 in position to be engaged by a friction drive wheel 119 which also rides against a friction wheel 120 carried on a shaft 121 having a castellated head 122 for connection with a magazine reel in the manner above described. No forward drive is necessary because this magazine is positioned for rewinding purposes. A suitable level winding arrangement as above described, or means for actuating the level wind arrangement in the magazine in the manner above described may also be employed, if such is necessary. The drive unit 14 may be separately controlled from the drive unit 13 by means of start and stop buttons positioned in any feasible or judicious location, as will be more apparent from the later description of the wiring diagram of Figure 21.

*The magazine latching and release mechanism*

Means are provided to positively latch a magazine in operative position when it is pressed into the receiver or tray 7. Included with those means are also means to effect a quick and positive release of the magazine when it is desired to remove it. Coupled with those release means is a switch mechanism designed to open the motor circuit whenever the magazine is released. All of these means are best illustrated in Figures 11, 12 and 13, with an initial part location reference to Figure 7.

Figure 12:
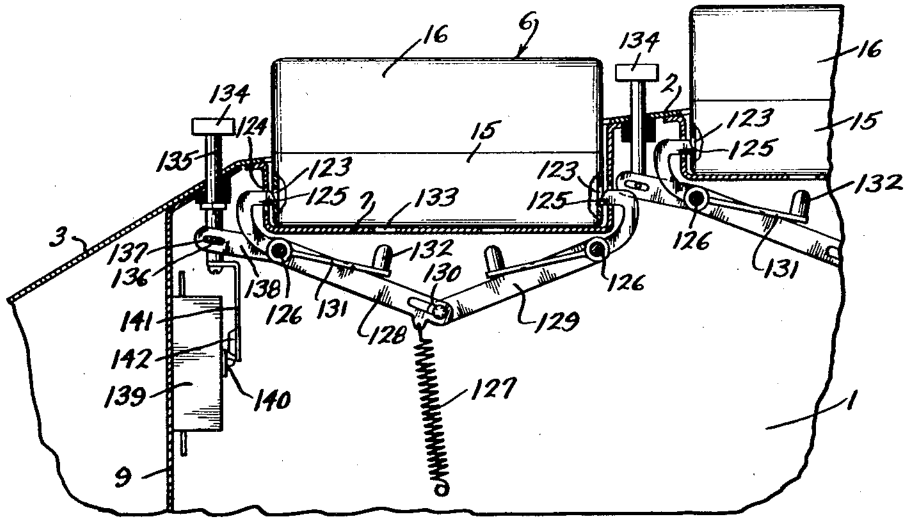
Figure 12 is a fragmentary vertical sectional view similar in character to Figure 7, but with the driving unit removed to illustrate the magazine holding and release mechanism.
Figure 13:
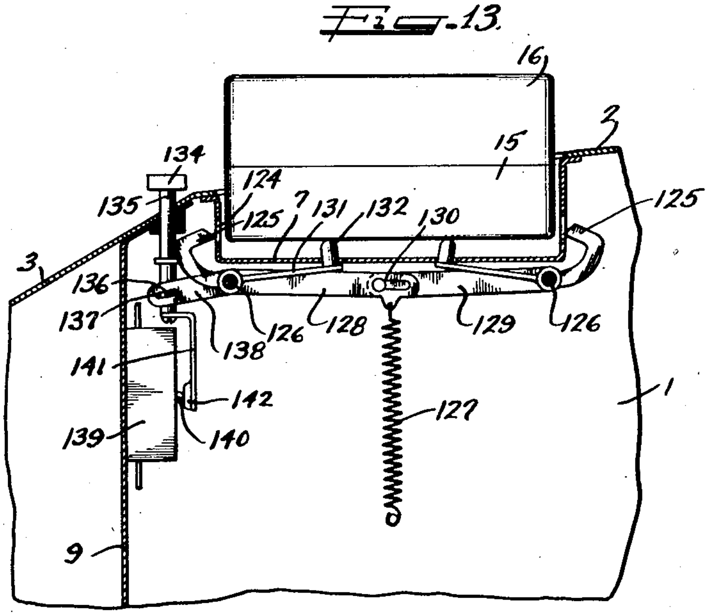
Figure 13 is a view of the same character and location as Figure 12, but showing the parts in a different stage of operation.

With reference to Figures 12 and 13, it will be seen that each magazine, in the lower part 15 thereof, is provided with a plurality of apertures 123, there being four such openings in the illustrated instance. Opposite each of the openings 123 the tray 7 is also apertured in its side wall as indicated at 124. When the magazine is seated in proper position in the tray 7 (Fig. 12) a latch 125 extends through the openings 124 and 123 and firmly holds the magazine in position. In the illustrated embodiment, there are two such latches 125 fixed to a shaft 126 extending along each side of the magazine, those shafts being suitably journalled adjacent the side wall of the casing 1. Each shaft is normally held in that degree of rotation to maintain the elements 125 in latching position by means of a spring 127 engaging the end of a lever 128, the other end of which lever 128 is keyed to the shaft 126. Opposite the lever 128 is another lever 129, the inner end of which has a pin and slot engagement with the lever 128 as indicated at 130, and the outer end of which is keyed to the opposite shaft 126. These levers 128 and 129, as best seen in Figure 11, are disposed near one side wall of the casing 1 in order to conserve space within the casing.

The shafts 126—126 also carry magazine release means in the form of a number of arms 131 each of which has one end keyed to the respective shaft 126, and carries a pusher 132 on the free end. Each pusher is adapted to project through a registering aperture 133 in the bottom of the tray 7 upon release of the magazine.

In order to actuate the release mechanism, a push key 134 is disposed adjacent the magazine and preferably in a central position as seen clearly in Figure 11. This push key is mounted on the top of a plunger 135, the lower portion of which carries a transversely extending pin 136 engaged in an elongated slot 137 of a crank arm 138, the inner end of which is keyed to the adjacent shaft 126.

Switch means are also controlled by the push key 134. A switch 139 may be feasibly mounted upon the partition 9 of the cabinet construction, and this switch has a projecting push button 140. The switch is preferably of the character commonly known in the trade as a "micro" switch which effects an opening of a circuit when the push button is pressed inwardly. An actuating arm 141 extends downwardly from the plunger 135 and is provided with a head 142 for actuating the push button 140 when the plunger is pressed downwardly.

From the above description, it will be seen that when a magazine is placed in the tray 7, it is a simple expedient to push the magazine to the bottom of the tray by a gentle pressure until the latches 125 engage through the openings 123 in the magazine. As explained above, the reel shaft and the level wind shaft within the magazine are then also automatically engaged with the corresponding shaft of the drive unit. The structure is seen in operative position in Figure 12. When it is desired to remove the magazine, it is a very simple expedient to press the push key 134 and thus rotate the adjacent shaft 126, as well as the remote shaft 126 by virtue of the pin and slot connection 130 between the levers 128 and 129. Rotation of these shafts by the pushing of the lever results in withdrawing the latches 125, and forcing the arms 131 upwardly so that the pushers 132 extend through the holes 133 in the bottom of the tray and partially elevate the magazine out of the tray, as seen in Figure 13. At the same time, it will be noted that the actuating arm 141 descends with the plunger 135 and opens the motor circuit by pressing in the push button 140 of the switch 139, thereby stopping the operation of the motor and the entire drive unit, and avoiding any possible injury to the mechanism inside the magazine, or to the operator's hand. It is a simple expedient for the operator to lift up the partially released magazine from the position seen in Figure 13.

As is evident from the showing in Figures 7, 11 and 12, similar holding and release mechanism is provided for the rear magazine acted upon by the drive unit 14. Obviously, a similar micro-switch mechanism may be incorporated with the release means for the rear magazine if so desired, or, in some instances the switch 139 for the forward magazine may control the circuit through both motors 62 and 117, depending upon what appears to be the most feasible construction for a particular installation.

*Remote control arrangements*

Many times, especially in connection with office work where the recording and reproducing device is used for office dictating and transcribing purposes, it may be desired to control the device from a relatively remote point. For example, the device may be placed in any judicious location in the vicinity of the dictator but entirely out of the way of the dictator, especially off his desk. He may then control the device by operating a remote control station upon his desk or affixed to the side of his desk so as to have added freedom of movement.

Figure 15:
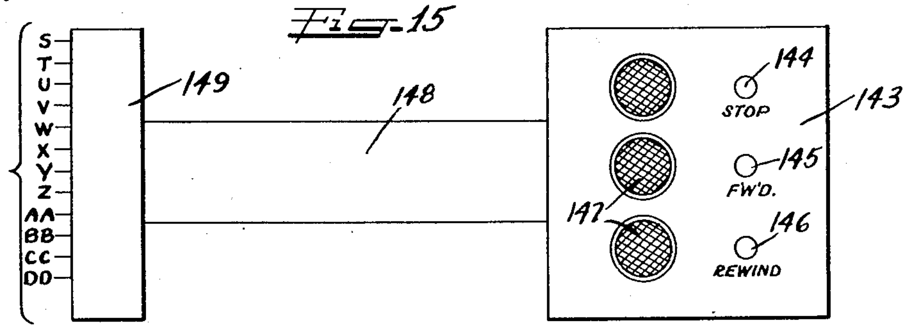
Figure 15 is a top plan view of a remote control arrangement for the magnetic recording and reproducing device.

To this end, the instant invention may be controlled effectively by a remote control station such as that illustrated in Figure 15. This station includes a box 143 which takes up a relatively small space, and the box embodies a push button 144 for stopping the apparatus, a forward button 145, a rewind button 146, and a jewel type indicating lamp 147 for each of the buttons. The box may be connected through a suitable multi-wire cable 148 to a plug 149 which may be inserted in a suitable receptacle in the cabinet of the device.

Figure 16:
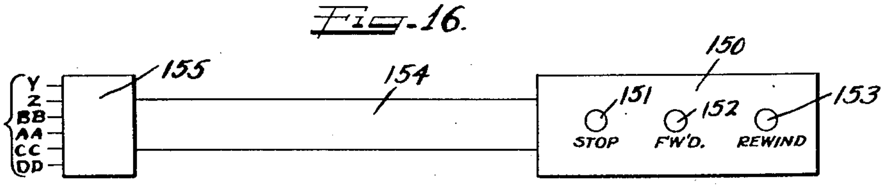
Figure 16 is a top plan view of a remote control arrangement of somewhat different construction.

A simpler remote control station is illustrated in Figure 16. This station includes a box 150 having push button switches therein including a stop button 151, a forward button 152, and a rewind button 153. This station does not embody the jewel type indicating lamp. The box 150 may be connected through a suitable multi-wire cable 154 to a plug 155 for insertion in a complemental receptacle in the cabinet of the recording and reproducing device itself.

Figure 17:
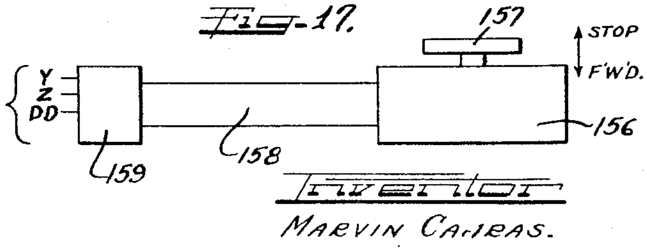
Figure 17 is a top plan view of another remote control arrangement embodying but a single push button, a simplified form of remote control.

Perhaps the simplest form of remote control station is illustrated in Figure 17. In this instance, a box 156 is provided having push button control 157 thereon which, when pressed downwardly actuates the recording and reproducing device in the forward direction, and which when elevated stops the device. The box may be connected through a suitable cable 158 to a plug 159 for insertion in a receptacle in the device.

It will be appreciated that such remote control stations may be provided as simple accessory equipment to the magnetic recording and reproducing device. It will also be appreciated that, if so desired, the remote control station may be built in to the base of an upstanding microphone placeable in an easily accessible position upon a dictator's desk, so as to either pick up dictation or record a conversation occurring in the entire room.

*The "listen back" arrangement*

Figure 18:
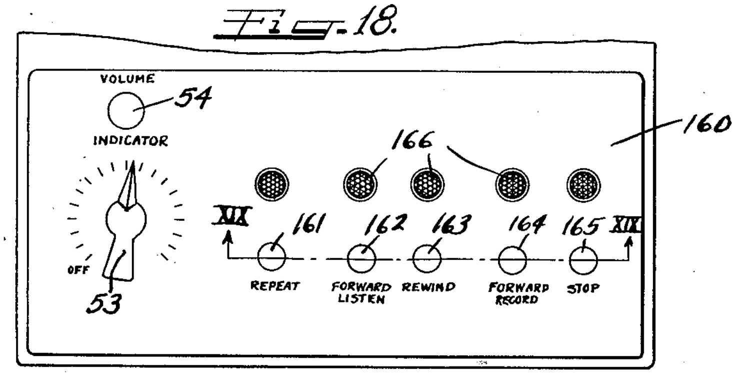
Figure 18 is a fragmentary face view of the exposed control panel portion of the device, showing a different control arrangement from that seen in Figure 1.
Figure 19:
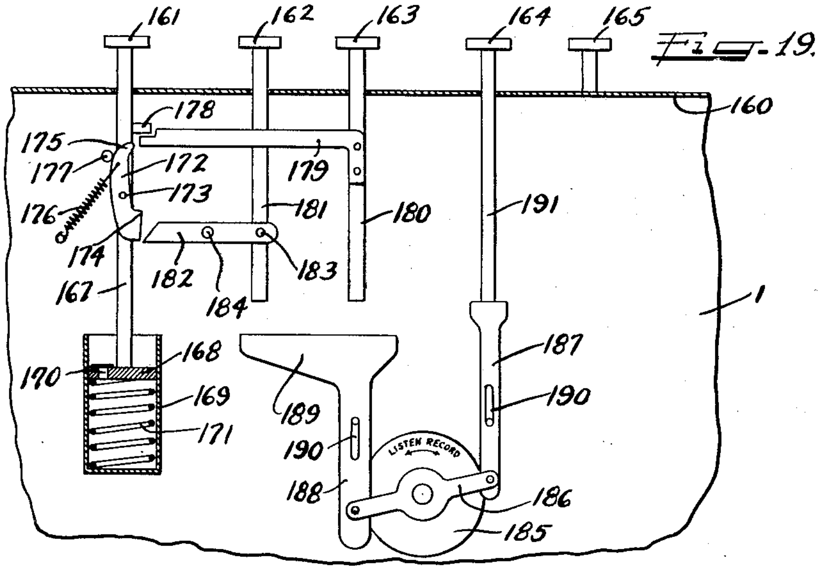
Figure 19 is an enlarged fragmentary vertical sectional view through the structure of Figure 18 taken substantially as indicated by the line XIX—XIX of Figure 18.
Figure 20:
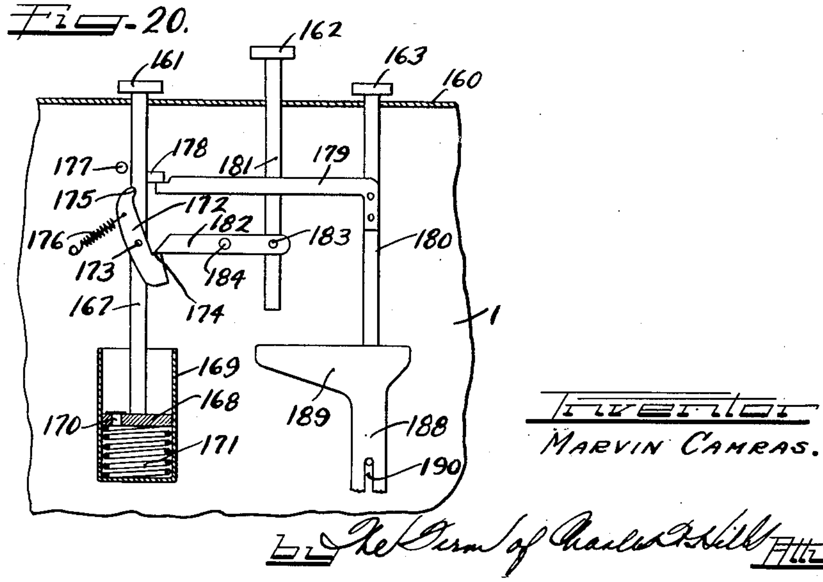
Figure 20 is a duplicate view of a portion of the structure of Figure 19, showing the parts in a different stage of operation.

In the event the magnetic recording and reproducing device is employed for office dictation work, it is desirable to provide the dictator with means of listening back to a portion of a recording so that the dictator may readily pick up an interrupted train of thought. Means for accomplishing this purpose are illustrated in Figures 18, 19 and 20. For purposes of clarity, the control push buttons are illustrated only diagrammatically in this showing.

With this arrangement, it is desirable to vary the character of the control panel 3 and the devices thereon above described in connection with Figure 1. The record and listen switch 52 is taken off the control panel, and a substitute mechanism is disposed inside the cabinet construction, a pair of push buttons being placed on the control panel to control that inside switching arrangement.

In this instance, a control panel 160 is provided which includes the same volume control 53 with its indicating lamp 54 as above described. Also in this panel is a series of push button controls including a repeat button 161, a forward listen button 162, a rewind button 163, a forward record button 164, and a stop button 165. Each of these buttons is provided with a jewel type signal lamp 166 to denote which button is controlling the operation of the device at any particular time.

The repeat button 161 is mounted on a shank 167 which terminates at its lower end in a piston 168 of a dashpot arrangement 169, the piston having the customary valved opening 170 therein. That is, there is a large opening permitting ready movement of the piston in a downward direction, and the valve itself which blocks the large opening on the upstroke has a minute opening therein to slow the upward movement. The piston is moved upwardly or forced back to its original position by means of a spring 171 in the dashpot. The shank or plunger 167 carries a latching lever 172 pivoted directly to the shank or plunger as indicated at 173. This latching member has a latching end 174, and at the opposite end is provided with an arcuate edge contour as indicated at 175. The latch member is normally urged into the position seen in Figure 20 by means of a spring 176 connected both to the latch member and at the opposite end anchored to the cabinet construction. A trip pin 177 extends outwardly from the cabinet construction adjacent the plunger 167, in position to also control the latch member on the upward stroke of the plunger. The plunger 167 also carries a rigid lug 178 projecting therefrom in position to engage the adjacent end of a horizontally disposed rigid bar 179 connected to the plunger 180 for the push button 163, the rewind button. The plunger 181 of the forward listen push button 162 has a horizontally disposed lever 182 pivoted thereto near one end of the lever as indicated at 183. This lever is pivoted intermediately at 184 to a pin carried by the cabinet construction.

Inside the cabinet construction a listen record switch arrangement 185 is located and controlled by a centrally pivoted lever 186. This lever is pivotally connected at one end to a vertically reciprocable actuating bar 187, and at the opposite end is pivoted to a vertically reciprocable actuating bar 188 having an enlarged head 189 on the upper end. Each of these bars 187 and 188 are limited to a vertical movement only by means of a suitable pin and slot connection as indicated at 190. The head 189 of the bar 188 may be engaged by either the plunger 180 or the plunger 181, and the bar 187 is engageable by a plunger 191 carrying the forward record push button 164.

In operation, the listen back arrangement is extremely simple and requires only a minimum of movements on the part of the dictator. Assuming that the forward record push button 164 has been pressed inwardly, so that the listen record switch is thrown in the opposite direction from the showing in Figure 19, and the dictator desires to listen back, it is simply necessary for him to press the repeat button 161. Upon the pressing of that button, the lug 178 on the plunger 167 by means of the arm 179 forces down the rewind button 163 so that its shank or plunger 180 actuates the listen record switch in the opposite direction by forcing down the bar 188. At the same time, the piston 168 is forced downwardly in the dashpot 169 against the action of the spring 171, and the latching end 174 of the latch lever 172 engages behind the free end of the lever 182. Consequently, rewinding of the recording medium 22 occurs during the time it takes the spring 171 to force the dashpot piston 168 back to its original position. This is only a relatively short interval of time and necessitates little waiting on the part of the dictator. As the plunger 167 is forced upwardly by the dashpot spring, the lever 182 is pivoted to move the plunger 181 and forward listen push button 162 inwardly and establish a closing of the forward listen circuit. As that circuit is established, the curvate edge portion 175 of the lever 172 strikes the trip pin 177 and is pivoted against the action of the spring 176 to free the lever from its latching engagement with the pivoted lever 182, thus releasing the interlocking of the parts, and restoring the parts to what may be termed neutral position.

It will be noted that during this operation, the various circuits of the recording and reproducing device have been shifted so that the device is energized for listening or reproduction, and the forward listen switch has been moved so as to energize the necessary circuit. Therefore, immediately upon restoration of the dashpot piston from the position seen in Figure 20 to the position seen in Figure 19, the rewound portion of the recording medium will be reproduced audibly through the loud speaker 10 for the benefit of the dictator. As soon as the dictator has listened back to the short portion of his previous dictation, he may then press the forward record button 164 to throw the listen record switch 185 in the opposite direction and proceed with his dictation.

In the event the dictator desires to make a correction or change some of his previous dictation, he may be pressing the rewind button cause a rewinding of a part of his previous dictation, and then by pressing the forward record button re-dictate the rewound portion. As the recording medium in this operation passes through the head 31, the previous dictation will automatically be erased or cleansed from the wire, and the new correct dictation placed upon the wire. It will be seen that the rewind button 163 may be pressed downwardly to establish rewinding, without disturbing the repeat and forward listen buttons or their associated apparatus.

Thus, it will be seen that the simplified mechanical arrangement shown in Figures 18, 19 and 20 effectively provides the dictator with substantially a universal control of the device with a minimum number of movements on the part of the dictator himself.

*The circuit arrangement*

Figure 21:
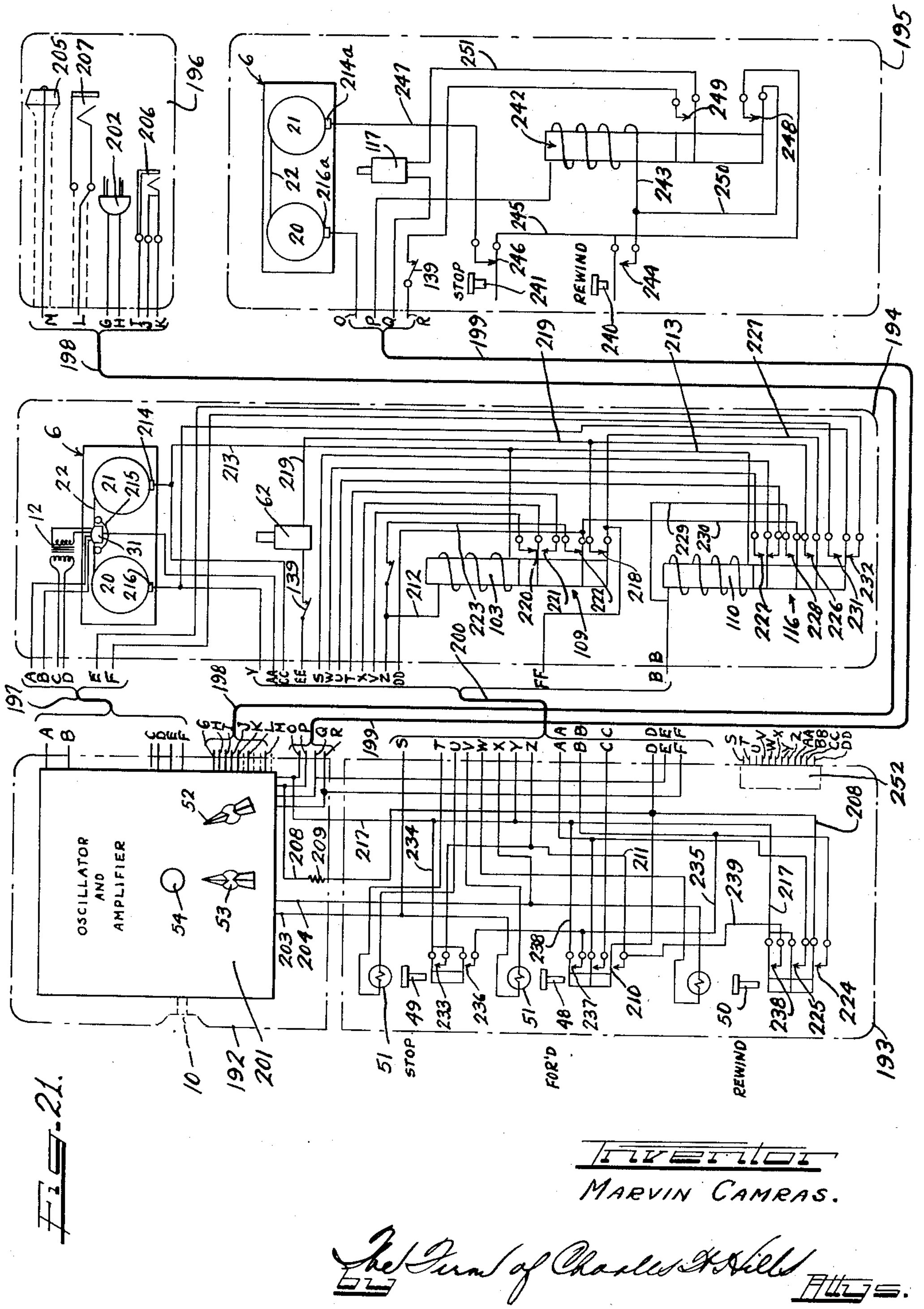
Figure 21 is a diagrammatic and schematic arrangement of the salient electrical circuits embodied in the instant invention.

The various circuit connections for the recording and reproducing device are illustrated briefly and diagrammatically in Figure 21. For purposes of clarity the circuit arrangement has been boxed off by dot-dash lines into what might be termed sub-assembly circuits so that salient parts of the various circuits may be more easily identified in relation to their actuation of structure described in connection with Figures 1 to 20, inclusive. To this end, the oscillator and amplifier circuits have been included in a dot-dash boxing 192; the control panel circuits are boxed as indicated at 193; the main drive unit, unit 13, together with the magazine circuit connections are boxed as indicated at 194; the circuits for the other drive unit, unit 14, are boxed as indicated at 195; and the plug and jack arrangement is boxed as indicated at 196.

Also for purposes of clarity, various portions of the circuits have been shown bracketed and connected by a master multi-wire cable, which cable may or may not be used in actual practice but which is convenient for illustrative purposes. For example, a portion of the oscillator and amplifier circuit arrangement is connected through cable 197 to the magazine associated with the main drive unit and to certain controls in that drive unit. Another portion of the oscillator and amplifier circuit is connected through cable 198 to the plug and jack assembly. The main energizing conductors from the amplifier arrangement are connected by way of cable 199 to the rewind drive unit, or unit 14. The connections from the control panel to the main drive unit and the relays and switches associated therewith are contained in cable 200.

Also, for the purposes of convenience and clarity, all wires or conductors theoretically contained within the cables 197, 198, 199 and 200 are indicated by letters of the alphabet both at the beginning and the end of the respective cables. In the instance of cables 198 and 200 the sequence of conductors at one end of the cable is not the same as that at the other end.

The oscillator and amplifier arrangement has been generally indicated by numeral 201, and very diagrammatically illustrated, the circuits involved in an oscillator and amplifier arrangement of this character being well known to those skilled in the art.

Starting with the plug and jack receptacle 196, when a plug 202 is connected with any suitable source of 115-volt alternating current, such current passes through conductors G and H which are included in the cable 198, and enter the oscillator and amplifier 201. Obviously a line switch may be included in this circuit and associated with the oscillator and amplifier or in some other feasible location, if so desired. The oscillator and amplifier arrangement is such that when conductors G and H are energized with a 115-volt alternating current there will be the same voltage and alternating current exiting from the arrangement 201 across a pair of conductors Q and R. Likewise by virtue of the rectification of current in the amplifier exiting conductors O and P will have a 110-volt direct current thereacross, the conductor O being the negative conductor and the conductor P being the positive. In addition, another pair of conductors 203 and 204 exiting from the arrangement 201 will have approximately 5-volt alternating current thereacross, these being the feed conductors to the pilot or signal lamps 51.

Again referring to the plug and jack boxing 196 there is shown a microphone jack 205 to which a microphone or other pick-up device may be connected for recording purposes. This jack is connected through primary cable M to the oscillator and amplifier arrangement 201. An output jack 206 is also provided to which an additional loud speaker or earphones may be connected. Earphones may be used in connection with this jack by the transcriber of recorded dictation. This jack is connected to the arrangement 201 through wires I, J and K. A first stage jack 207 is also included in the plug and jack assembly, and this jack is connected to the arrangement 201 by means of a primary cable L. It is desirable to use this jack for the microphone or pickup in the case where a record is made from a radio loud speaker, or other sound source having extra volume so as to prevent overloading of the first tube of the amplifier circuit. In other words, this jack cuts out a portion of the amplification where the same is not needed by the pick-up element.

For recording purposes a microphone may be connected to the jack 205, the switch 52 thrown to the record position, volume control 53 adjusted to give the correct amount of volume as indicated by the volume level indicator 54, and this volume control is preferably exercised immediately at the start of the recording operation, after the motor 62 has been energized and the recording medium 22 is travelling from reel 20 to reel 21.

In order to start the device in operation for recording purposes, it is a simple expedient to press the forward button 48, holding it down momentarily until the respective relay, the aforesaid relay 103, has operated and closed the associated circuit through the gang switch 109. In Figure 21, relay 103 is shown in the energized position, that is, the core of the relay has been drawn upwardly and the gang switch has closed all of the associated circuits for the upward movement of the relay armature. The circuit causing energization of the motor may be traced through as follows: From the positive 110-volt direct current conductor P through a lead 208 containing a current limiting resistor 209, through a portion of conductor D—D, contact points 210 of the switch 48, conductor 211 to and through conductor Z passing through the cable 200, thence through conductor 212, the coil of relay 103, conductor 213, contact 214 with the recording medium, through the recording medium itself, the conductive bridge 215 around the recording head, contact 216 with the recording medium on reel 20, conductor Y also passing through the cable 200 to conductor 217 and back to conductor O, the negative side of the 110-volt line. With the gang switch 109 thus closed, the motor circuit proper includes the following: Conductor F—F from conductor R (one side of the 115-volt alternating current circuit) through the cable 200, to contact point 218 of the gang switch, thence through a wire 219 to the motor 62, and the return circuit embodies the conductor E—E with the switch 139 therein and which also passes through the cable 200 back to conductor Q, the other side of the 115-volt line.

As stated hereinabove, the magazine might incorporate means for passing current directly through the recording medium so as to insure a stopping of the motor in the event the recording medium should break, and in the event the recording medium is about to become totally unwound from either of the reels 20 or 21. Each of the reels is provided with a contact, and when all of the recording medium runs off that particular contact, the circuit through the medium is broken. These contacts are designated 214 and 216 for the reels 21 and 20, respectively, in Figure 21. The current travels from either contacts 214 or 216 through the recording medium itself, and a shunt bridge 215 is provided around the recording head 31, the shunt bridge being connected at an intermediate point to cable conductor A—A.

During a recording operation, the erasing portion in the head 31 is energized from the oscillator circuit through conductors A and B passing through cable 197. The recording part of the head, as the case may be, is energized from the amplifier circuit by way of conductors C and D also passing through cable 197 and the aforesaid transformer 12 is embodied in this circuit. The preferable high frequency component through the coil of the recording and reproducing portion of the head 31 may be obtained by way of leakage from the erasing part of that head, since the conductors A and B will be carrying high frequency current from the oscillator.

While the device is recording or reproducing, the motor having been started as above explained in the forward direction, the pilot lamp 51 corresponding to the forward button 48 will be illuminated. This is accomplished by way of a simple circuit including the aforesaid 5-volt alternating current conductors 203 and 204, the current travelling through conductor 203, the pilot lamp 51, conductor V passing through cable 200, contact 220 of the gang switch 109, and thence through conductor X also passing through cable 200, back to conductor 204. Each of the other push buttons, the stop button 49 and the rewind button 50 are equipped with similar pilot lamps operating through similar circuits which need not be specifically set forth herein, but which are clearly illustrated in Figure 21. It will be noted, however, that the circuit through conductor T of the pilot lamp for the stop switch 49 is broken at contact 221 of the gang switch 109, and that contact will not be closed until the relay 103 is de-energized, so that the stop switch pilot lamp remains dark while operation proceeds from one of the other switches, and is illuminated when the recording medium is not moving at all.

The other contact 222 of the gang switch 109 establishes a connection between a wire 223 and the wire 212 leading to the coil of the relay 103 so that this coil remains energized and the relay remains in circuit closing position after the starting button 48 has been released. It will be recalled that the operation of relay 103 causes its armature to physically move the reverse rewind friction drive roll 96 out of contact with the motor shaft 63 and the idler friction roll 94 above discussed in connection with Figure 14.

If, during the recording operation or the reproduction operation as the case may be while the device is operating in the forward direction, the recording medium 22 becomes so far unwound from the reel 20 as to open the circuit at the contact 216, the above described circuit through the relay 103 is opened and the relay releases thereby breaking the circuit through the motor 62 and stopping operation completely. Pressing the forward button 48 will not again start operation, because pressing that button cannot reclose the circuit where it was broken at contact 216. The only way the circuit can again be closed at contact 216 is by changing magazines, or operating the device in the reverse or rewind direction so that the recording medium again accumulates on reel 20 and closes the circuit at contact 216. To effect this rewinding operation, the rewind button 50 is pressed momentarily to energize the relay 110, which relay and its associated gang switch 116 is illustrated in deenergized position in Figure 21. Current will then flow from the positive 110-volt conductor 208 through contact 224 of the rewind switch 50 to conductor B—B which passes through the cable 200, and then through the coil of relay 110, through conductor 213, contact 214 with the recording medium on reel 21, through the recording medium, the bridge 215, and thence through conductor A—A to contact 225 of the rewind switch to the negative 110-volt conductor 217. The armature of the relay 110 is thereby moved to closed position, reversing the gang switch 116 from the position seen in Figure 21 and the motor 62 is energized by way of alternating current conductor E—E, aforesaid conductor 219, contact 226 of the relay switch, a conductor 227, and conductor F—F which is the other side of the alternating current line. With reference once again to Figure 14 it will be recalled that the relay 110 physically moves the forward drive friction wheel 64 out of contact with the motor shaft and the clutch 71, and the relay 103 having been released has permitted the reverse friction drive wheel 96 to return to operating position so that the recording medium now moves in the rewind or reverse direction.

The release of the relay 103 by the breaking of the circuit at the contact 216, above mentioned, opened the circuit through the pilot lamp for the forward button. Energizing of relay 110 closes the circuit through the pilot lamp of the rewind button by way of conductor 204, conductor W, contact 227 of the relay switch, and conductor F back to the opposite side of the low voltage line, conductor 203. Upon releasing the rewind button 50 the relay 110 remains energized by virtue of contact 228 connecting the relay coil to conductor D—D by way of wires 229 and 230.

If the recording medium or wire 22 breaks or tends to become completely unwound from the reel 21, the circuit will be broken at the contact 214 thus opening the circuit by way of conductor 213 through the coil of relay 110 and releasing this relay. Again pressing the rewind button will not start operation in the reverse direction, that is in the same direction of movement of the medium when the circuit was broken at contact 214. The only way the circuit can again be made at that contact, is by changing magazines or again pressing the forward button to start operation in the forward direction.

When the relay 110 is energized for the rewind operation, contact 231 of the gang switch 116 being closed, shorts out the loud speaker 10, and at the same time contact 232 now being opened cuts off the oscillator circuit to de-energize the erase portion of the head 31 so that a recording will not be removed from the medium during the rewinding operation.

It will be noted from the above description that if the recording medium tends to run off either of the reels 20 and 21, the respective relay then in operation will be released to stop operation. As pointed out above, the other relay may be energized to resume operation in the opposite direction. However, if the recording medium breaks it is apparent that neither relay can be energized, because the circuit will be opened through the shunt bridge 215 and consequently conductor A—A. Nothing can then be done to effect operation in either direction except by way of repair of the break in the recording medium.

During operation of the device in either direction, pressing the stop button 49 will short out either relay 103 or 110 and thus stop the drive system in the manner above explained. Assuming, for example, that relay 103 is energized, when the stop button is pressed closing of the circuit at contact 233 results in the 110-volt direct current energizing the coil of that relay taking the following path: From the positive line P through conductor 208 to conductor D—D, thence through the cable 200, and through contact 222 of the relay to conductor 223 and back through conductor Z to conductor 211, through the contact 233, conductor 234, to conductor 217 and the negative side of the 110-volt line, conductor O. The relay coil is thereby shorted out, and the relay will obviously be released. To short out the coil of relay 110, the current by way of the stop button takes the following path: Conductor 208 to conductor D—D, through the cable 200, thence through D—D, conductor 230, contact 228, conductor 229, to conductor B—B, thence back through the cable 200 and from conductor B—B to conductor 235, up through contact 236 of the stop button, and then through conductors 234 and 217 to the opposite side of the 110-volt line.

Pressing of the forward or rewind button, when operation is proceeding under the other button, will not effect any injury to the device or to the circuit. Assuming, for example, that the device is operating in the rewind direction, having been energized by pressing the rewind button 50 in the manner above explained, and assuming further that while this operation was proceeding the forward button 48 was pressed, contact point 237 of the forward button would close a circuit shorting out the coil of relay 110 thus releasing that relay just before relay 103 is energized. The current would take the following path: Through conductors 208, D—D, 230, contact 228, conductors 229, B—B, 235, to contact 237 of the forward button, thence through a conductor 238 to conductor 217 in the opposite side of the 110-volt line. Likewise, if the device is operating in the forward direction, and the rewind button 50 is pressed, the closing of the circuit through contact 238 of the rewind button will short out the coil of the relay 103, and stop the forward movement, at the same time that relay 110 is energized. In shorting out the coil of relay 103, the current would take the following path: Through conductors 208, D—D, 223, Z, 211, a conductor 239, the contact 238 and rewind button, and through conductor 217 to the opposite side of the line.

From the above description, it will be noted that no injury to the device or the circuit will result in the event both the forward and rewind buttons are pressed together. The coils of both relays will be shorted out in that event so that the drive motor will not be energized.

The other drive unit, the unit generally indicated by numeral 14 and shown in Figure 21 within the boxing 195, is provided preferably with its own push button controls. These controls may comprise a rewind button 240, and a stop button 241. Energy for this unit is derived from the aforesaid 110-volt line conductors O and P, and the alternating current conductors Q and R through the cable 199.

When the rewind button 240 is pressed, the current will flow through conductor P and coil of relay 242, conductor 243, contact 244 of the rewind button, conductor 245, contact 246 of the stop button, conductor 247, and thence through the recording medium 22 itself by way of contacts 214*a* and 216*a*, to conductor O. The energizing of the relay moves the core upwardly from the position seen in Figure 21 so that relay contacts 248 and 249 are in circuit closing position. The closing of circuit through contact 248 shorts out contact 244 of the rewind button, permitting the current to pass through a conductor 250 and thence through the contact 248 to conductor 245, thus maintaining the relay energized after the release of the rewind button 240. The closing of the circuit through contact 249, energizes the motor 117 by way of a conductor 251 and the alternating current conductors Q and R.

The pressing of the stop button 241 breaks the current at contact 246, thus de-energizing the relay 242, and opening the motor circuit at contact 249.

It will be recalled that the switches 139 in the circuit of motor 62 and a similar switch 139 in the circuit of motor 117 of the respective drive unit correspond to the micro-switch shown in Figures 7, 12 and 13 which is automatically operated by the placing and removal of a magazine. When a magazine is removed, either switch 139 is automatically opened thus breaking the circuit through the respective motor, and when a magazine is placed into position in the respective tray, that switch is automatically closed.

From the above specific descriptions of the respective circuits, and certain of the paths followed by the current during certain operations, other variations in the control of the device and the respective current paths will be apparent without further specific descriptions herein.

In the lower portion of the boxing 193 of Fig. 21, I have indicated diagrammatically a receptacle 252 for a remote control station of the character shown in Fig. 15. The contacts in the receptacle 252 may be connected in parallel respectively with conductors S, T, U, V, W, X, Y, Z, A—A, B—B, C—C and D—D, and control of the device may be had either by way of the remote control station or by way of the push buttons 48, 49 and 50 on the device itself. Likewise, it will be understood that suitable remote control receptacles may be had to accommodate remote control stations of the types shown in Figures 16 and 17 of the drawings, if the same are desired, and any number of these stations may be used in parallel.

From the foregoing, it is apparent that I have provided a magnetic recording device which may function as a record reproducer, a record maker, or a dictating machine, and wherein one recording may be wound for later reproduction while a recording is being made, the machine embodying the use of simply removable and replaceable magazines containing all of the recording medium proper, and the device being entirely controlled by push buttons, equipped with automatic safety features, and with the circuit arrangements connected in substantially fool-proof fashion so that no damage occurs to either the mechanism or the wiring circuits in the event the operator makes a mistake in the operation. Furthermore, it is noted that a repeat arrangement is provided whereby a dictator can listen back to a short portion of a record at any time and immediately proceed with the following dictation. It should also be noted that the device employs a simple yet positive driving system with a quick-acting braking system, and results in the automatic application of the brakes every time the machine is stopped, or results in the stopping of the respective motor in the application of brakes in the event a magazine is removed from the machine. Further, the machine is compact, takes up little space, may be mounted close at hand, or in some other suitable location and controlled remotely, the entire structure being highly durable, and very economical to operate.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination, a magnetic recorder assembly including a cabinet, a magazine receiving socket formed in said cabinet, a magazine received snugly in said socket and having a reel shaft, a drive shaft extending into said socket for coupling with said reel shaft, latching means to hold said magazine in coupled position in said socket, ejector means reciprocable in and out of said socket for forcing said magazine outwardly from said socket to uncouple said shafts, manual release means mechanically connected to said latching means and said ejector means to contemporaneously unlatch and uncouple said magazine when operated, and a spring operatively connected with said manual release means biasing the same to hold said latching means in latching position and said ejector means in retracted position.

2. In combination, a magnetic recording assembly including drive means, electrical circuit arrangements controlling said drive means and arranged for the making of a magnetic recording, means associated with said assembly forming a socket for a magazine, a magazine containing a recording medium removably mountable in said socket, means to hold said magazine in operative position in said socket, and a push button mechanism arranged to release said holding means, and open the circuit to said drive means, said mechanism including lift means to force the magazine partially out of said socket.

3. In combination, a magnetic recorder assembly including a pair of magazine receiving trays, a magazine containing a recording medium removably mounted in each tray, driving means for selectively actuating the recording medium in each of said magazines, a recording and reproducing head positioned to act on the medium in one magazine, an electrical circuit controlling said drive means, and means to energize said circuit to move one medium in either direction and selectively to move the other medium in one direction simultaneously with the first medium or individually.

4. In combination, a magnetic recorder assembly including a plurality of magazine receiving trays, a magazine removably mounted in each tray and containing a movable recording medium, electrically controlled drive means for selectively moving the recording medium in each of said magazines, and electrical circuit control means for energizing said drive means selectively to move the medium of one magazine in either direction and selectively to move the medium of a second magazine in one direction simultaneously with the first medium or individually.

5. In combination, a magnetic recording assembly including a plurality of trays for removably receiving in each identical magazines containing movable recording mediums, a separate electrically controlled drive unit for each tray to motivate the respective recording medium, one of said drive units being reversible, and electrical circuit control means for energizing said drive units selectively to move the medium of one magazine in either direction while moving the medium of a second magazine in one direction.

6. In a magnetic recorder assembly, means providing a pair of magazine receiving trays, a separate drive unit associated with each tray, a magazine containing a pair of reels carrying a recording medium removably mountable in each tray, one of said drive units being selectively operable to move the respective medium in forward and rewind directions, the other unit being operable to move the respective medium in rewind direction, said drive units having a rewind speed greater than the forward speed of said one unit, and electrical circuit control means for energizing said drive units selectively to move the medium of one magazine in either direction while moving the medium of the other magazine in rewind direction.

7. In combination, a magnetic recorder assembly including a pair of magazine receiving trays, a magazine containing a recording medium removably mountable in each tray, driving means capable of selectively actuating the medium in both magazines simultaneously, a recording and reproducing head positioned to act on the medium in one magazine, electrical circuits controlling said drive means, and means to energize said circuits to selectively move one medium in either direction while the other medium is being rewound for later recording or reproduction.

8. In a magnetic recorder assembly, means providing a pair of magazine receiving trays, a separate drive unit associated with each tray, a magazine containing a pair of reels carrying a recording medium removably mountable in each tray, one of said drive units being selectively operable to move the respective medium in forward and reverse directions for recording, reproducing, and rewinding purposes, the other unit being operable to move the respective medium for the purpose of rewinding, electrical circuit arrangements governing the operation of said drive units, means for holding a magazine firmly in a tray, switch means operable to automatically open the circuit to the respective drive unit upon removal of a magazine, and push button mechanism arranged to release said magazine holding means, control said switch means, and force a magazine partially out of its tray.

9. In combination in a magnetic recording device, a casing having means for receiving a magazine, a magazine removably mountable in said means, a pair of reel shafts and a level wind shaft extending without said magazine, a drive unit in said casing including a forward drive shaft, a reverse drive shaft, a level wind drive shaft all extending into said magazine receiving means for automatic connection with said magazine shafts upon mounting of the magazine, each of said magazine shafts having a cross pin therein, each of the said shafts of said driving unit having a castellated head, the head on each said driving unit shaft being telescopically associated with the shaft, and resilient means urging each head outwardly toward the respective magazine shaft.

10. In a magnetic recording and reproducing device, a recording medium movable in either direction, drive means for moving said medium, a recording head through the magnetic field of which said medium may travel, an electrical circuit controlling the action of said drive means and to energize said head to magnetize said medium or function as a pick-up when reproducing from said medium, a stop control in said circuit effective to stop motion of said medium in either direction, a repeat control separate from said stop control, and means in said circuit responsive to said repeat control to cut out said head, rewind said medium a predetermined amount, and then move said medium forwardly and energize said head to reproduce from the rewound portion of said medium.

11. In a magnetic recording and reproducing device, a recording medium movable in either direction, drive means for moving said medium, a recording head through the magnetic field of which said medium may travel, an electrical circuit controlling the action of said drive means and to energize said head to magnetize said medium or function as a pick-up when reproducing from said medium, a stop control in said circuit effective to stop motion of said medium in either direction, a repeat control separate from said stop control, means in said circuit responsive to said repeat control to cut out said head, rewind said medium a predetermined amount, and then move said medium forwardly and energize said head to reproduce from the rewound portion of said medium, and timing means controlling said circuit to limit the rewinding of said medium to a predetermined interval.

12. In a magnetic recording and reproducing device, a recording medium, reversible drive means for moving said medium in either direction, an electrical circuit controlling the action of said drive means and including a forward reproducing control and a rewind control, a repeat control mechanically connected to said rewind control and said forward reproducing control to effect sequential operation of the rewind control and then the forward reproducing control, and time delay means connected to said repeat control to limit operation of the rewind control to a predetermined length of time.

13. In a magnetic recording device, a recording medium movable in either direction, drive means for moving said medium, a recording head through the magnetic field of which the medium travels forwardly, an electrical circuit, means in said circuit to selectively energize said head to magnetize said medium or act as a pick-up to reproduce from said medium, a series of push button controls in said circuit and including a repeat button, a forward reproducing button, a rewind button, and a forward recording button to energize said circuit to effect a corresponding operation, a plunger on said repeat button, and means carried by said plunger to sequentially actuate the rewind button and the forward reproducing button.

14. In a magnetic recording device, a recording medium movable in either direction, drive means for moving said medium, a recording head through the magnetic field of which the medium travels forwardly, an electrical circuit, means in said circuit to selectively energize said head to magnetize said medium or act as a pick-up to reproduce from said medium, a series of push button controls in said circuit including a repeat button, a forward reproducing button, a rewind button, a forward recording button each operable to energize said circuit arrangement to effect a corresponding operation, a plunger on said repeat button, means carried by said plunger to sequentially actuate the rewind button and the forward reproducing button, and a dash pot arrangement associated with said plunger to limit the effective operation of said repeat button.

15. In a magnetic recording device, a magnetizable recording medium, movable means carrying said medium, a motor to drive said movable means, an electrical motor control circuit, an auxiliary circuit arrangement including the medium itself as a conductor, means in said auxiliary circuit to control the energization and deenergization of the motor circuit, a recording head adjacent said medium, and a shunt bridge in said auxiliary circuit to by-pass all but a negligible amount of current in said medium around the field of said head.

16. In a magnetic recording device, a magnetizable recording medium, an electrically energized head adjacent said medium, electrical means arranged to pass current directly through said medium, and a shunt conductor contacting said medium on each side of said head to by-pass all but a negligible amount of the current in said medium around the field of said head.

17. In a magnetic recording device, a pair of rotary reels, a magnetizable recording medium carried by said reels and movable from one to the other thereof, an electrically driven prime mover for actuating said reels, an electrical circuit embodying said medium as a conductor and said prime mover, means associated with said reels to open said circuit and stop said prime mover at a predetermined time, a recording and reproducing head adjacent said medium between said reels, means to electrically energize said head, and a shunt connection contacting said medium on each side of said head to by-pass substantially all the current through said medium around the field of said head.

18. In a magnetic recording device, a magnetizable recording medium, a recording head, means to electrically energize said head, movable means to carry said medium through the field of said head, electrical means to actuate said movable means, a circuit including said electrical means and also said medium as a conductor, a shunt contacting said medium on each side of said head to by-pass substantially all the current in said medium around the field of said head, and a conductor in said circuit connected to said shunt whereby the current entering said medium will pass therethrough to said shunt and then through said conductor in the event of a disruption in the circuit including the medium on the opposite side of said head.

MARVIN CAMRAS.

REFERENCES CITED

The following references are of record in the file of this patent:

UNITED STATES PATENTS

| Number | Name | Date |
|---|---|---|
| 773,985 | Ries | Nov. 1, 1904 |
| 800,524 | Wetzel | Sept. 26, 1905 |
| 862,400 | Jensen | Aug. 6, 1907 |
| 894,199 | Gaston | July 28, 1908 |
| 947,148 | Browne | Jan. 18, 1910 |
| 1,044,609 | Watson | Nov. 19, 1912 |
| 1,123,147 | Sherman | Dec. 29, 1914 |
| 1,237,496 | Frankhauser | Aug. 21, 1917 |
| 1,560,721 | O'Reilly | Nov. 10, 1925 |
| 1,939,181 | McCash | Dec. 12, 1933 |
| 2,011,350 | Wittel | Aug. 13, 1935 |
| 2,075,978 | Dunning et al. | Apr. 6, 1937 |
| 2,126,299 | Wittel et al. | Aug. 9, 1938 |
| 2,248,790 | Stapelfeldt | July 8, 1941 |
| 2,253,302 | Kiel | Aug. 19, 1941 |
| 2,282,051 | Helbing et al. | May 5, 1942 |
| 2,284,043 | Clausen | May 26, 1942 |
| 2,364,556 | Somers | Dec. 5, 1944 |
| 2,422,143 | Somers et al. | June 10, 1947 |

FOREIGN PATENTS

| Number | Country | Date |
|---|---|---|
| 4,934 of 1926 | Australia | Nov. 26, 1926 |

OTHER REFERENCES

Description of the Automatic Pistol, Caliber .45. February 14, 1914, page 15, Plate II.